July 1, 1958     S. M. SCALA     2,841,182
BOUNDARY LAYER FLUID CONTROL APPARATUS
Filed Dec. 29, 1955     2 Sheets-Sheet 1
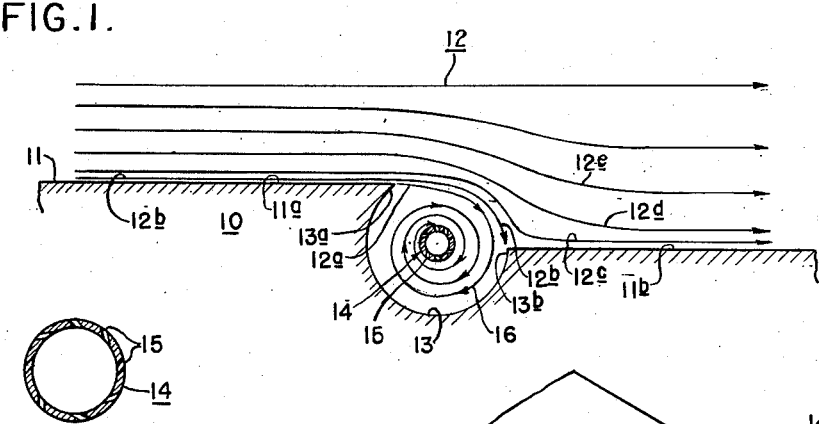
FIG.1.
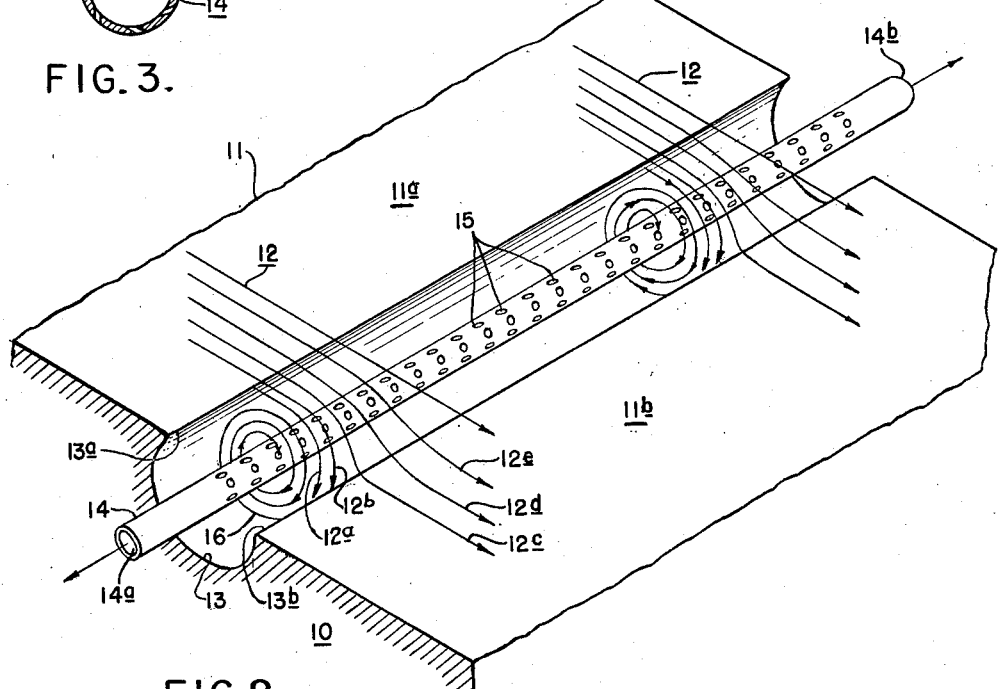
FIG.3.
FIG.2.
INVENTOR
SINCLAIRE M. SCALA
BY
AGENT INVENTOR
SINCLAIRE M. SCALA
BY [signature]
AGENT United States Patent Office 2,841,182
Patented July 1, 1958

2,841,182

BOUNDARY LAYER FLUID CONTROL APPARATUS

Sinclaire M. Scala, Bronx, N. Y., assignor to Westinghouse Electric Corporation, East Pittsburgh, Pa., a corporation of Pennsylvania Application December 29, 1955, Serial No. 556,352

5 Claims. (Cl. 138—37)

This invention relates to boundary layer fluid control for fluid flow surfaces, more particularly to fluid flow diffusers and has for an object to provide structure in which a high rate of diffusion may be attained with a minimum loss in efficiency.

It is well known that low energy boundary fluid layers rapidly increase in thickness and separate from the surface structure bounding the flow of the fluid stream in an adverse pressure gradient. In a diffuser, for example, wherein a stream of gas or liquid is converted from a condition of high velocity and low pressure to a condition of low velocity and high pressure, there exists a pressure rise along the diffuser in the direction of fluid flow, that is, toward the large end of the diffuser. Under such conditions, a layer of the fluid adjacent the boundary surface of the diffuser becomes retarded in velocity because of friction, so that it has a velocity considerably less than the velocity of the main portion of the fluid stream. If the walls of the diffuser diverge too rapidly, so that a high pressure gradient exists, the main portion of the fluid stream will break away from the wall and the resulting turbulence will cause the efficiency of fluid transmission to fall to a very low value. Because of the above, it has heretofore been found necessary to limit the rate of divergence of the diffuser walls, with the result that the diffuser has necessarily been made very long. In many applications a long diffuser is highly undesirable, for example, between the compressor and the combustion chamber of a gas turbine power plant.

In view of the above, it is a further object of the invention to provide a diffuser of short axial length, yet highly efficient in operation.

In accordance with the invention, a body having a boundary surface associated with a flow of fluid to be diffused, is provided with a recess of curved cross-section extending across the surface transversely to the direction of flow of the fluid. The portion of the surface extending downstream from the recess is offset with respect to the portion of the surface extending upstream from the recess in order to provide the required diffusion. As the fluid flows past the recess, the boundary layer fluid is drawn into the recess and whirls therein in a spiral path or vortex. The adjacent layer of fluid (traveling at higher velocity) is then drawn against the downstream boundary surface to effect the required diffusion.

In order to propagate the boundary layer fluid vortex, some of the fluid must be bled from the recess. This is effected by means of a foraminous evacuation tube disposed in the recess and extending longitudinally thereof. Since the fluid at the center of the vortex has been found to have considerably less energy than at the periphery of the vortex, the tube is located at the center of the vortex. With this arrangement, only a small proportion of fluid need be bled to permit entry of sufficient boundary layer fluid to maintain the vortex.

In a diffuser of the annular type for use with a gas turbine, the inner and outer walls of the diffuser are provided with annular recesses of the type described above and the inner and outer wall portions extending downstream of the recesses are offset radially inwardly and outwardly, respectively, to effect the required diffusion. In this arrangement the evacuation tubes are of annular configuration to conform to the recesses.

These and other objects are effected by the invention as will be apparent from the following description and claims taken in connection with the accompanying drawings, forming a part of this application, in which:

Fig. 1 is a cross-sectional view of a body providing a fluid flow surface having the invention incorporated therein;

Fig. 2 is a perspective view of the structure shown in Fig. 1;

Fig. 3 is an enlarged cross-sectional view of the evacuation tube;

Figure 5:
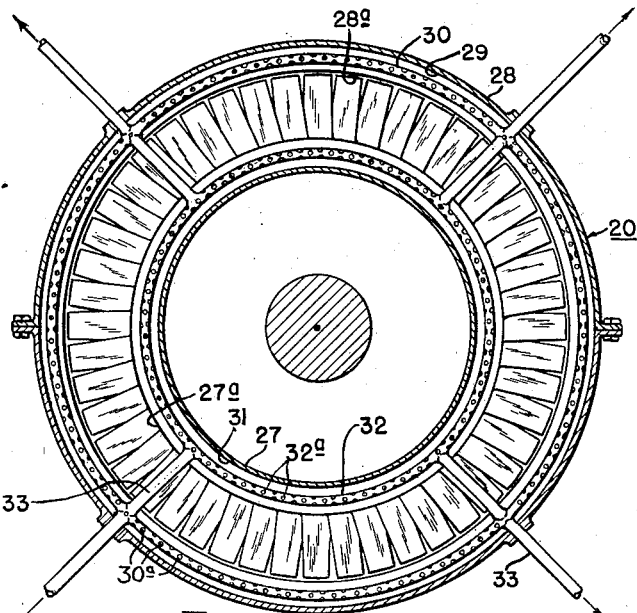
Fig. 5 is a cross-sectional view taken on line V—V of Fig. 4.

Referring to Figs. 1 and 2, there is shown a body 10 having a boundary surface 11 associated with a flow of fluid 12 to be diffused. Within the boundary surface 11 there is provided a recess or channel 13 of circular cross section and dividing the boundary surface 11 into an upstream portion 11a and a downstream portion 11b. The recess 13 extends the full length of the body 10 in a direction transverse to the flow of the fluid 12. The surface portions 11a and 11b may be flat and impart substantially sharp corners to the upstream and downstream edge portions 13a and 13b of the recess. However, the downstream portion 11b is disposed in offset parallel relation with the upstream portion 11a to effect the desired diffusion of the fluid flowing therepast.

An evacuation tube 14 is supported in any desired manner within the recess 13 in a central position and is coextensive with the recess. The evacuation tube may be made of foraminous material or otherwise provided with numerous apertures 15 for a purpose which will subsequently be described.

In operation, as the fluid 12 flows past the boundary surface 11a, a boundary layer 12a will form next to the boundary surface, which is of slower velocity than that of the main fluid stream 12. As the boundary layer air flow 12a is shed from the upper edge 13a of the recess 13, it will deflect toward the recess 13 and assume a spiral or vortical flow path 16 toward the center of the recess. The fluid layer 12b adjacent the boundary layer 12a will also be deflected toward the recess 13 but will strike the downstream edge 13b of the recess 13, creating a stagnation zone which traps the vortex 16 in the recess 13. As the vortex 16 spirals toward the evacuation tube 14 it loses some of its initial energy, so that in the region adjacent the tube 14 the energy thereof is at a minimum value. This low energy fluid subsequently enters the tube 14 through the openings 15 and is drawn off through the ends of the tube 14a, 14b to a region of lower pressure value.

With the constant evacuation of the low energy air from the center of the vortex 16, the vortex is perpetuated and will be maintained indefinitely during operation. As the remainder of the fluid stream 12 flows downstream beyond the recess 13, the remainder (including layers 12c, 12d, 12e, etc.) will be drawn toward the downstream surface 11b to effect the diffusing action. As seen in Fig. 1, the fluid layer 12c forms a new boundary layer, but since most of the pressure rise of the fluid occurs across the recess 13, the pressure gradient along the surface 11b is of a relatively small order. It will be noted that the main stream 12 passes through a diffusion stage across the recess 13, wherein the velocity is considerably reduced and the pressure value is considerably increased in a manner well known in the art.

Although the apertures 15 in the evacuation tube 14 may be of any desired configuration, they are preferably skewed or otherwise disposed tangentially to the air flow to thereby facilitate the flow therethrough. This feature is best shown in Fig. 3.

Figure 4:
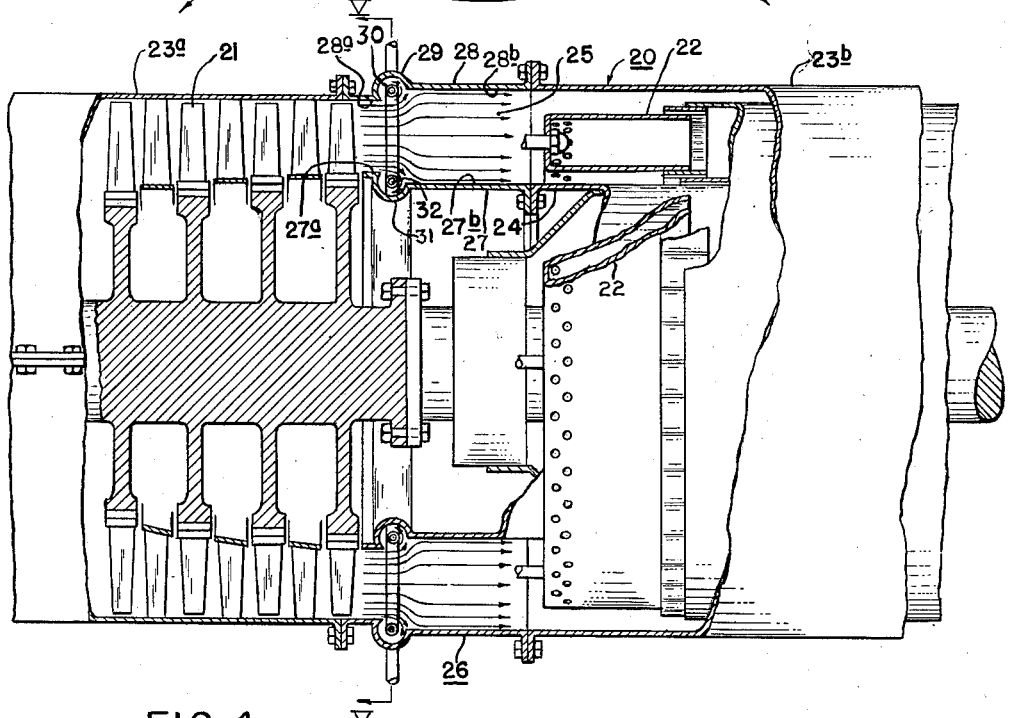
Fig. 4 is a fragmentary axial sectional view of an aviation gas turbine power plant having a diffuser incorporating the invention.

In Figs. 4 and 5 the invention is illustrated in conjunction with a typical aviation gas turbine power plant generally designated 20. The power plant may be of any desired type; hence only the portions essential for comprehension of the invention have been illustrated. The power plant comprises an air compressing section 21 and an annular combustion chamber 22 disposed within a composite cylindrical housing 23a, 23b and having a central tubular core member 24 which, in conjunction with the housing portion 23b, forms an annular passage 25 for delivery of compressed air to the combustion chamber 22.

Interposed between the air compressing section 21 and the combustion chamber 22 is a diffuser structure 26 for reducing the velocity and increasing the pressure of the air prior to delivery to the combustion chamber 22.

The diffuser structure 26 is provided with inner and outer annular wall members 27 and 28, respectively, disposed in concentric relation with each other and forming a continuation of the air passageway 25. The outer wall member 28 may be interposed between the outer casing portions 23a and 23b and attached thereto in any desired manner, while the inner wall member 27 may be attached to the core member 24.

The outer wall member 28 is provided with an annular outwardly extending recess or channel 29 of circular cross section interposed between an upstream wall surface portion 28a and a radially outwardly offset downstream wall surface portion 28b. Within the recess 29 there is provided an annular evacuation tube 30 having a series of apertures 30a provided therein. As in the first embodiment, the tube 30 is of considerably smaller diameter than the recess 29 and is centrally disposed therein.

In a similar manner, the inner wall member 27 is provided with an upstream wall surface portion 27a and a downstream wall surface portion 27b radially offset inwardly therefrom. It will be seen that the upstream wall surface portions 27a and 28a define a fluid passageway which is relatively narrower and hence of smaller cross-sectional area than the fluid passageway defined by the downstream wall surface portions 27b and 28b, so that as the fluid flows through the diffuser, in the direction of the arrows, it is subjected to a diffusing action. An annular recess or channel 31 of circular cross section extending radially inwardly of and interposed between the upstream wall surface portion 27a and the downstream wall surface portion 27b is provided with an evacuation tube 32 centrally disposed therein and extending coextensively therewith. The tube 32 is provided with a plurality of apertures 32a. The evacuation tubes 30 and 32 may be connected to each other by means of a plurality of radial tubes 33 which may be extended outwardly through the outer wall member 28 to a region of lower pressure value, such as the surrounding atmosphere. If desired, the air exhausted therethrough may be utilized to operate engine accessories or the like (not shown).

The operation of the diffuser 26 is similar to that described in connection with the first embodiment shown in Figs. 1 to 3. That is, as the compressed air from the compressing section 21 flows through the diffusing passageway 25 at relatively high velocity, boundary layer air is drawn into the recesses 29 and 31 and forms spiral vortices therein which have high energy in their outer peripheries but have low energy in their central portions adjacent the evacuation tubes 30 and 32. As the low energy air is drawn off through the evacuation tubes 30 and 32, additional boundary layer air is drawn into the recesses 29 and 31 to propagate the vortices and the air flowing downstream of the recesses is drawn radially outwardly or diffused until the main stream fills the diffusing passageway 25. It then continues at lower velocity and higher pressure into and around the combustion chamber 22 for supporting combustion of fuel therein in a manner well known to the art.

Since the diffusing action is effective over a relatively short axial distance, the diffuser structure 26 may be of relatively short axial length thereby reducing the overall length of the turbine power plant 20.

It will now be seen that the invention provides a simple yet efficient arrangement for reducing the cumulative deleterious effects of boundary layer fluid flow and that the boundary layer fluids are removed from the diffuser in a region where their energy has been reduced to a relatively low value, so that the main fluid stream remains essentially intact and is not robbed of a very large portion of the fluid contained therein.

It will further be seen that the invention provides a relatively short diffuser structure having the efficiency of considerably longer equivalent diffuser structures of heretofore known types.

While I have shown my invention in but one form, it will be obvious to those skilled in the art that it is not so limited, but is susceptible of various changes and modifications without departing from the spirit thereof.

What is claimed is:

1. In a body having a surface associated with a flow of fluid, wherein a low energy boundary layer of fluid is present adjacent said surface; means for removing said boundary layer of fluid including a recess in said surface extending transversely to the flow of fluid, said recess being of curved cross-sectional shape, means for creating a stagnation streamline immediately downstream of said recess, whereby said boundary layer forms a vortex in said recess about the central axis of said recess, and a foraminous tubular member disposed adjacent the central axis of said recess and extending substantially the length of said recess, said tubular member being of smaller cross-sectional area than said recess and being in communication with a region of lower pressure than said fluid.

2. A diffuser comprising tubular wall structure including an upstream surface portion and a downstream surface portion in axial communication with each other and defining a fluid passageway, said downstream surface portion encompassing a larger cross-sectional area than said upstream surface portion, a recessed channel portion interposed between and continguous with said upstream surface portion and said downstream surface portion, said channel extending transversely to the direction of fluid flow and being of curved cross-sectional shape, whereby during conditions of fluid flow through said passageway the boundary layer of fluid leaving said upstream surface portion forms a vortex in said channel about the central axis of said channel, and a foraminous tubular member disposed adjacent the central axis of said channel and extending substantially the length of said channel, said tubular member being of smaller cross-sectional area than said channel and being in communication with a region of lower pressure than said fluid.

3. A diffuser comprising concentric inner and outer tubular wall structure defining an annular fluid passageway, one of said walls including an upstream surface portion and a downstream surface portion in axial communication with each other, said downstream surface portion being in radially offset relation with said upstream surface portion, whereby the fluid passageway is of larger cross-sectional area adjacent said downstream surface portion than adjacent said upstream surface portion, an annular recessed channel portion interposed between and contiguous with said upstream surface portion and said downstream surface portion, said channel extending transversely to the direction of fluid flow through said passageway and being of curved cross-sectional shape, whereby during conditions of fluid flow through said passageway the boundary layer of fluid leaving said upstream surface portion forms a vortex in said channel rotating about the central axis of said channel, and a tubular member disposed in a central position in said channel and extending substantially the length of said channel, said tubular member being provided with a plurality of apertures communicating with the inner portion of the vortex, and means providing fluid communication between said tubular member and a region of lower pressure than the fluid pressure in said passageway.

4. A diffuser comprising concentric inner and outer tubular wall structure defining an annular fluid passageway, each of said walls including an upstream surface portion and a downstream surface portion in axial communication with each other, said downstream surface portions being in radially offset relation with said upstream surface portions, whereby the fluid passageway is of larger cross-sectional area adjacent said downstream surface portions than adjacent said upstream surface portions, annular recessed channel portions interposed between and contiguous with said upstream surface portions and said downstream surface portions, said channels extending transversely to the direction of fluid flow through said passageway and being of curved cross-sectional shape, whereby during conditions of fluid flow through said passageway the boundary layers of fluid leaving said upstream surface portions form a vortex in each of said channels, and tubular members disposed in a central position in said channels and extending substantially the length of said channels, said tubular members being of smaller cross-sectional area than said channels and being provided with a plurality of apertures, and means providing fluid communication between said tubular members and a region of lower pressure than the fluid pressure in said passageway.

5. In a body having a surface associated with a flow of fluid, wherein a low energy boundary layer of fluid is present adjacent said surface; means for removing said boundary layer of fluid including a recess in said surface extending transversely to the flow of fluid, said recess being of curved cross-sectional shape, means for creating a stagnation streamline immediately downstream of said recess, whereby said boundary layer forms a vortex in said recess having its center adjacent the axis of said recess, and a foraminous tubular member of smaller cross-sectional area than said recess and disposed adjacent the central axis of said recess, said tubular member extending substantially the length of said recess and being in communication with a region of lower pressure than said fluid, said surface comprising a first portion contiguous with the upstream edge of said recess and a second portion contiguous with the downstream edge of said recess, said second surface portion being offset with respect to said first surface portion.

References Cited in the file of this patent

UNITED STATES PATENTS

| | | |
|---|---|---|
| 2,037,940 | Stalker | Apr. 21, 1936 |
| 2,110,986 | Kadenacy | Mar. 15, 1938 |
| 2,206,193 | Kadenacy | July 2, 1940 |

FOREIGN PATENTS

| | | |
|---|---|---|
| 340,379 | Great Britain | Jan. 1, 1931 |
| 619,722 | Great Britain | Mar. 14, 1949 |